United States Patent
Hutchinson

[15] 3,634,938
[45] Jan. 18, 1972

[54] DENTAL HANDPIECE

[72] Inventor: Seymour M. Hutchinson, 7 Jody Lane, Plainview, N.Y. 11803

[73] Assignees: Seymour M. Hutchinson, Plainview; Adrian N. Spitz, Massapequa; I. Jordan Kunin, New York, N.Y., part interest to each

[22] Filed: Aug. 19, 1970

[21] Appl. No.: 65,031

[52] U.S. Cl. ..................................................32/27, 32/DIG. 7
[51] Int. Cl. .......................................................A61c 19/02
[58] Field of Search......................................32/26, 27, DIG. 7

[56] References Cited

UNITED STATES PATENTS

| | | | |
|---|---|---|---|
| 3,295,514 | 1/1967 | Hein et al. | 32/DIG. 7 |
| 3,397,457 | 8/1968 | Gosselin | 32/DIG. 7 |

Primary Examiner—Robert Peshock
Attorney—I. Jordan Kunin

[57] ABSTRACT

A dental handpiece having an air turbine drive for the drill bit and a water jet stream for cooling the operating area, including fiber optics means for directing light upon the dental work area, and including a light source for the fiber optics incorporated into the dental handpiece. The air and water systems are utilized to absorb heat generated in the handpiece by the light source.

17 Claims, 9 Drawing Figures

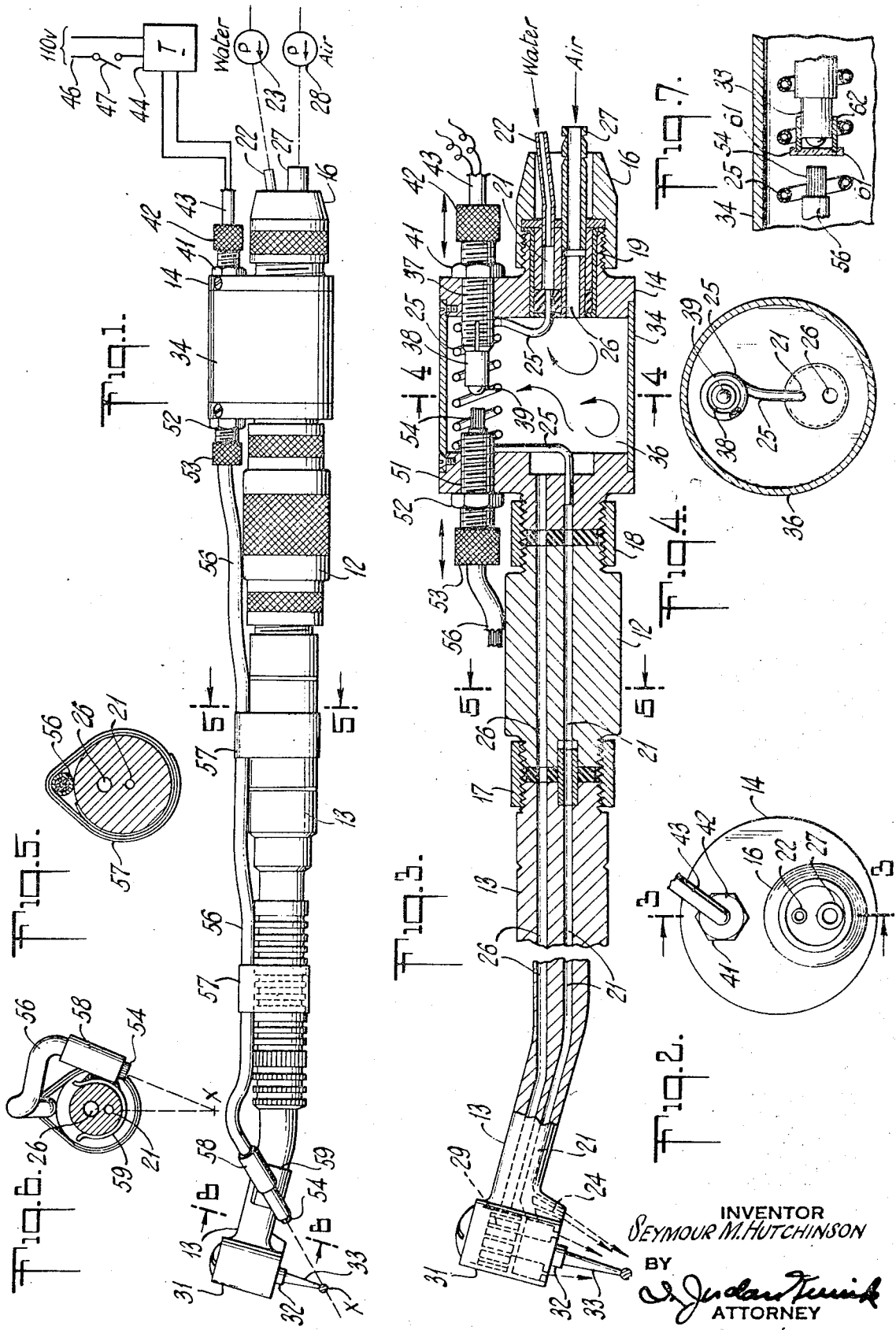

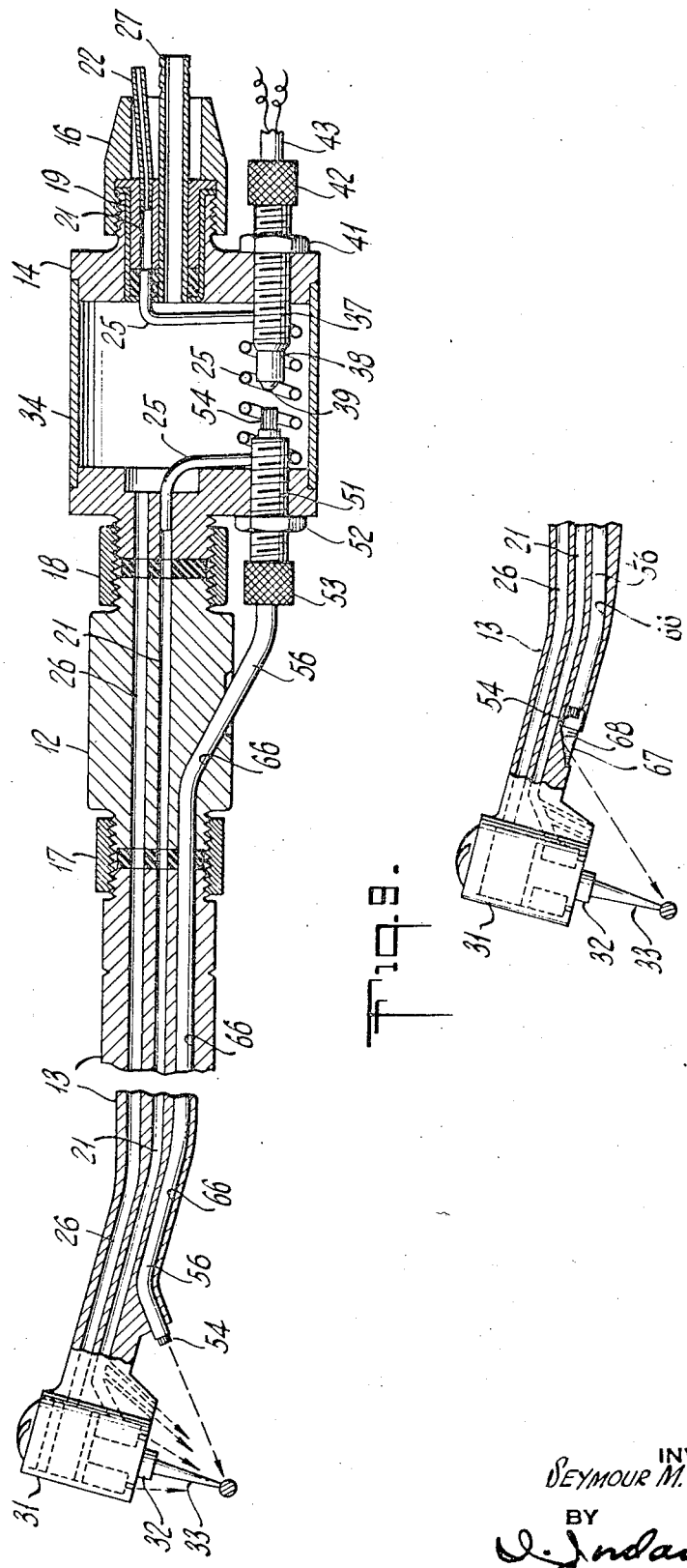

DENTAL HANDPIECE

BACKGROUND OF THE INVENTION

1. Field of the Invention

This invention relates generally to dental apparatus and, more particularly, to a dental handpiece drill, including a fiver optics means for directing light upon the work area and incorporating a light source for said fiber optics in the handpiece itself.

2. Description of the Prior Art

Prior art dental handpieces have recently incorporated fiber optics thereon for directing light upon the work area whereby the work of the dentist is facilitated. A portion of the fiber optics component is attached to the handpiece of the dental instrument while another long and ungainly portion trails away to a remote light source box which contains the fiber optics illuminator. The fiber optics illuminator has a high density output electric bulb which is adjacent the input end of the fiber optics bundle which transmits the light to the output end of the fiber optics bundle located on the hand drill and directed at an angle therefrom to the work area where the drill bit operates. In order to compensate for attenuation of light because the length of the fiber optics bundle from the light source to the dental handpiece may extend upwards of 6 to 10 feet, it is necessary to provide a very high-density heat producing light source which not only consumes a considerable amount of electric power but also produces a great deal of heat which unduly raises the temperature of the operating room to the discomfiture of the occupants. A long fiber optics bundle is very costly and, when not bound down along its length, it is subject to bending and kinking which results in broken fibers which reduce the efficiency of the bundle. Furthermore, the high-density high output light source for the fiber optics bundle is fairly expensive, and requires the occasional replacement of the high output light bulb contained therein. As a result of a prior art search, the following patents were discovered: U.S. Pat. Nos. 2,038,911; 2,066,313; 2,679,103; 3,032,878; 3,032,879; 3,098,299; 3,109,238; 3,120,705 and 3,210,848. None of the foregoing patents disclose the structure of the present invention nor suggest the manner in which it could be accomplished. The remote high-density light sources as described hereinbefore have been and are available commercially.

SUMMARY OF THE INVENTION

The present invention comprises a dental hand drill which has a turbine drive for rotating the drill bit at high speed, and a water conduit for projecting a cooling medium upon the work area for reducing the heat generated by the bit. In order to overcome the disadvantages described hereinbefore in connection with the remote high-density, high output light source, the present invention incorporates into the housing of the dental hand tool itself a light source located at the input end of a short bundle of optical fibers whereby attenuation of light is greatly diminished. Accordingly, the invention makes possible the reduction of the fiber optics bundle from a length of approximately 6 to 10 feet, or more, to a short length of approximately 4 to 6 inches. Thus, the requirement of a high-density high output light source is eliminated and a long, awkwardly trailing fiber optics cable eliminated. Substituted for the considerable weight of the previously long fiber optics cable is a lightweight electric lead wire which can extend along the air and water supply cable for the handpiece.

These and other novel features and advantages of the present invention will be described and defined in the following specification and claims.

BRIEF DESCRIPTION OF THE DRAWING

FIG. 1 is a side elevation of the dental hand tool of the present invention shown partially schematically and without strict adherence to scale, and further incorporating a diagrammatic illustration of the power source for the local light input for the fiber optics bundle;

FIG. 2 is a somewhat enlarged rear end view of the apparatus shown in FIG. 1;

FIG. 3 is a vertical section view, partly fragmented, taken on line 3—3 of FIG. 2 and showing the interior structure of the apparatus shown in FIG. 1, some parts being shown in elevation;

FIG. 4 is a view taken on line 4—4 of FIG. 3;

FIG. 5 is a view taken on line 5—5 of FIG. 1;

FIG. 6 is a view taken on line 6—6 of FIG. 1;

FIG. 7 is a fragmentary view of a portion of FIG. 3 showing a heat shield attachment for the light source;

FIG. 8 is a view similar to FIG. 3 showing an embodiment of the apparatus wherein the fiber optics cable is incorporated into the interior of the elongated dental hand tool; and FIG. 9 is a fragmentary view of another embodiment of the apparatus shown in FIG. 8.

DESCRIPTION OF THE PREFERRED EMBODIMENT

Referring now to the drawings in detail, there is shown a dental drill handpiece, generally designated 11, comprising a central section 12, a turbine-drill supporting section 13, a light, air and water transmission housing 14, and a rear end section 16, all of said parts being generally circular in cross section.

Sections 12 and 13 are secured together by means of a threaded bushing 17; sections 12 and 14 are secured together by means of a threaded bushing 18; and section 16 is threadably secured to a rearwardly extended threaded collar 19. Suitable means, well known in the art, are provided at these juncture areas for providing watertight and airtight seals.

Extending through sections 12, 13, 14 and 16, are portions of a water channel 21 which form a single, continuous path for a stream of water that is connected by means of a tube 22 in section 16 to a source 23 of water under pressure, said water emerging from a port 24 in the forward portion of section 13 which aims a jet stream of water under pressure for cooling and irrigating the region in which the end of the drill bit is operating. Water channels 21 are joined within the chamber of housing 14 by means of a tube 25 which is coiled in the intermediate portion thereof for the purpose described hereinafter.

Located longitudinally in sections 12, 13 and 16, are linked portions of a common air channel 26 to the rear portion of which is connected a tube 27 leading to a source 28 of air under pressure for driving turbine wheel 29 mounted in head 31 at the outer end of the hand tool. In the intermediate portion of air channel 26, air passes from one portion of channel 26 in section 16 through the chamber of housing 14, thence to the other portions of channel 26 in sections 12 and 13, the circulation of air in the interior of housing 14 performing a function which will be described hereinafter. Connected to turbine impeller 29 and rotated thereby is a shaft 32 to which is removably connected a drill bit 33 for performdental operations.

The different, separable portions of the hand tool are manufactured in a manner well known in the art whereby the portions of water channel 21 and air channels 26 are aligned with each other except for modifications in the region of housing section 14 which contains some of the novel features of the present invention.

Housing 14 comprises a generally cylindrical case 34 whose diameter is somewhat exaggerated in the drawings in order to permit clarity of illustration, said case 34 being hermetically sealed in housing 14. Case 34 encloses a chamber 36 through which air under pressure from channel 26 in the rear portion of housing 14 enters and circulates and proceeds thence to and through channels 26 in the forward portion of section 14 and in sections 12 and 13. Threadably mounted in the rear end of housing 14 is a bushing 37, on the forward end of which is mounted a base 38 of a light bulb 39 located in chamber 36 intermediate the forward and rear ends of housing 14. The exact location of light bulb 39 may be adjusted by threadably rotating bushing 37 and locking the latter in place by means of nut 41 bearing against the rear outside surface of housing 14. Bushing 37 has an externally located knurled extension 42 for manual rotation thereof.

Extending through bushing 37 is an electric line cord 43, one end of which is connected to base 38 of bulb 39, the other end of which is connected to a transformer 44 which, in turn, is connected to a conventional electric power source 46 of 110 volts or the like, for illuminating light bulb 39. A suitable manually operated switch 47 may be connected between transformer 44 and power source 46 for turning the current on and off in light bulb 39.

Threadably mounted within the forward end wall of housing 14 is a bushing 51, the longitudinal location of which may be adjusted by rotating said bushing and then locking it in position by means of nut 52 bearing against the forward outside surface of housing 14. Bushing 51 has an externally located knurled extension 53 for facilitating manual rotation of said bushing. Extending through the axial aperture of bushing 51 is a bundle of fiber optics 54, the inner end of said bundle extending into the interior of chamber 36 and being located directly opposite and spaced apart from the exposed end of light bulb 39. The fiber optics bundle 54 extends through bushing 51 and by means of enclosure cable 56 is connected by suitable means such as tapes 57 to the top of sections 12 and 13, the other end of which is suspended in a support tube 58 connected to a spring clip 59 clasping the front end portion of section 13. Extending from the forward end of cable 56 is the outer exposed end of the fiber optics bundle 54 which is located in a position to direct a beam of light onto the operating area in which the grinding end of drill bit 33 is located.

Bulb 39 may comprise any one of a number of suitable miniature vacuum incandescent lamps that are currently available. Some of these lamps operate in a range of approximately 2 to 5 volts, and transformer 44 is designed to step down the available power source of 110 or 220 volts, or the like, to the operating voltage of bulb 39. It is understood that the space between the light output end of bulb 39 and the input end of the fiber optics bundle 54 within chamber 36 will be adjusted and set by means of nuts 41 and 52, respectively, for optimum transmission of light into said fiber optics bundle. In some cases, the light output end of bulb 39 may be formed in the shape of an optical lens for optimum transmission of light to the input end of the fiber optics bundle. Also, case 34 may be made of transparent or translucent plastic or the like so that said adjustment and setting may be determined visually.

In some embodiments, the illuminating end of bulb 19 may project excess heat upon the nearby exposed end 54 of the fiber optics cable. Accordingly, as shown in FIG. 7, a heat shield 61 of a suitable size and shape and made of a suitable transparent material such as glass or quartz, may be releaseably attached to base 38 by means of circularly spaced clip elements 62, said clip elements being slidable longitudinally on base 38 so that the optimum location of heat shield 61 may be adjusted and fixed. In some embodiments, shield 61 may take the form of a lens element which has focusing powers for concentrating the light emitted from bulb 39 upon the adjacent exposed end of the fiber optics cable 54.

It will be noted that the coiled portion of tube 25 within housing 41 closely surrounds the inner portion of bushing 37, base 38, bulb 39, the exposed end of fiber optics cable 54 and the inner portion of bushing 51, whereby heat generated by bulb 39 is absorbed by water flowing through tube 25 and carried away from the interior of housing 14. Further, cooling action is accomplished by the circulation of air passing through the interior chamber 36 of housing 14 which enhances the cooling effect of the water passing through tube 25. According as empirical conditions require or warrant, either the water cooling or the air cooling may be utilized alone, or in combination with one another.

In some embodiments of the present invention, it may be desirable to enclose at least a portion of the fiber optics cable within the confines of the forward portion of the hand tool instead of having said cable connected to the exterior thereof as shown in FIG. 1. Accordingly, in the embodiment shown in FIGS. 8 and 9, cable 56 may extend through a suitable longitudinal aperture 66 in sections 12 and 13 of the hand tool while all of the other components are substantially the same as those shown in FIGS. 1 and 3 with identical reference numerals.

In the embodiment in FIG. 8, the outer end of fiber optics bundle 54 extends externally from the hand tool and the light output therefrom is projected at the location of the grinding end of drill bit 33.

In another embodiment, as shown in FIG. 9, the outer end of fiber optics bundle 54 terminates in the interior of the hand tool. Juxtaposed to the outer end of said bundle is a prism element 67 located within an aperture recess 68 of the hand tool whereby the beam of light projected from the end of the fiber optics bundle is reflected toward the operating area in which the grinding end of drill bit 33 is located.

It is understood that in both of the embodiments described and illustrated herein, either the air cooling or water cooling means alone may be employed for absorbing and transmitting away the heat generated by bulb 39 in chamber 36, depending upon the efficiency of the respective water or air cooling means. Where very high-heat generation by bulb 39 is experienced, then it may be advantageous to utilize both the water cooling and the air cooling means in combination within chamber 36.

By utilizing a short fiber optics bundle which is, throughout its entire length, immobile on the handpiece, considerable economies are realized as well as the prevention of kinking and bending experienced with a long bundle where a good number of the glass fibers of the bundle become broken, thereby reducing the efficiency of light transmission. By restraining and confining fiber optics cable 56 from movement on handpiece 11 either by means of tapes 57 and clip 59 in FIG. 1, or within channel 66 in FIG. 8, said cable is ensured against accidental kinking and the possibility of breaking of individual glass fibers within bundle 54.

It is contemplated that the principles of the present invention may be incorporated into tools other than dental handpieces in order to project light into areas that are otherwise difficult to illuminate, such as in various industrial applications as well as in medicine. In such applications, it would be optional for the operator to utilize either air cooling or water cooling alone, or both means of cooling in combination.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

I claim:

1. A dental hand drill comprising a turbine for rotating a dental burr, air pressure means for driving said turbine in said hand tool, water pressure means in said hand tool for projecting a stream of water in the area where the dental burr operates, a bundle of fiber optics on said hand tool, the exit end of said fiber optics being arrayed to project a beam of light upon the area where the drill bit operates, a chamber in said hand tool, said air pressure means circulating in said chamber prior to transmission thereof towards said turbine, a light source in said chamber, said light source being located close to the inlet end of said fiber optics bundle, a tubular coil in said chamber surrounding said light source and said inlet portion of said fiber optics bundle, said water means flowing through said tubular coil prior to emerging as said stream from said hand tool.

2. A dental hand tool including air pressure means for driving a turbine therein and water pressure means for projecting a stream of water onto the area where the dental burr operates, comprising a bundle of elongated fiber optics on said hand tool, the exit end of said fiber optics being arrayed to project a beam of light upon said operating area, a chamber in said hand tool, a light source in said chamber, the inlet end of said fiber optics bundle being located in said chamber and opposite said light source, said water means and said air means passing through said chamber to cool said light source.

3. A dental hand tool comprising a first channel for transmitting air under pressure to drive the dental drill turbine, a second channel transmitting water under pressure to project a stream thereof onto the area where the dental burr operates, a bundle of elongated fiber optics on said hand tool, the exit end of said fiber optics being arrayed to project a beam of light upon said operating area, a chamber in said hand tool intermediate the ends thereof, a light source in said chamber, the inlet end of said fiber optics bundle being located in said chamber and opposite said light source, said air passing through said chamber, and a coiled tube surrounding said light source and said inlet end of said fiber optics bundle, said tube being connected in the line of said water channel.

4. A dental hand tool comprising a hand piece, a turbine drive on the end of said hand piece for rotating a drill bit, air transport means in said hand piece for driving said turbine, water transport means in said hand piece for projecting a stream of water onto the area where the drill bit operates, fiber optics means on said hand piece, the output end of said fiber optics means being arrayed to project a beam of light upon said operating area, a light source on said hand piece located near the input end of said fiber optics, at least one of said air and water transport means passing in the region of said light source for absorbing the heat generated thereby and transmitting it away from the input end of said fiber optics means.

5. A tool according to claim 4 and further comprising a chamber intermediate the ends of said hand piece, the input end of said fiber optics means and said light source being located within said chamber, and said air and water pressure means passing through said chamber.

6. A tool according to claim 5 and further comprising first means for adjusting and setting the location of the input end of said fiber optics means within said chamber and second means for adjusting and setting the location of said light source within said chamber, said first and second means being operated to determine the desired spacing between said input end of said fiber optics means and said light bulb.

7. A tool according to claim 5 in which the enclosure of said chamber is made of a material which renders the light source and input end of said fiber optics means visible from outside said chamber.

8. A tool according to claim 6 in which said first and second means are located externally of said chamber.

9. A tool according to claim 5 wherein said air transport means causes the circulation of air within said chamber for cooling said light source.

10. A tool according to claim 5 wherein said water transfer means passes through said chamber in the form of a coil surrounding said light source to cool the latter.

11. A tool according to claim 4 and further comprising a heat shield interposed between said light source and the input end of said fiber optics means.

12. A tool according to claim 4 wherein said fiber optics means is connected externally to said hand piece.

13. A tool according to claim 4 and further comprising an elongated channel in said hand piece, the major portion of said fiber optics means extending through said channel.

14. A tool according to claim 13 and further comprising a prism in said hand piece located adjacent the output end of said fiber optics means, said prism deflecting the light beam from said fiber optics means to the desired location where the drill bit operates.

15. A tool according to claim 4 and further comprising confining means for rendering said fiber optics means immobile on said hand piece.

16. A tool according to claim 15 wherein said fiber optics means is arrayed along the exterior of said hand piece and said confining means comprises at least one encircling means enclosing both said fiber optics means and said handpiece to secure said elements together.

17. A tool according to claim 15 wherein said confining means comprises an elongated channel in the interior of said handpiece through which a major portion of said fiber optics means extends.

* * * * *

REEXAMINATION CERTIFICATE (1058th)
United States Patent [19]

Hutchinson

[11] B1 3,634,938

[45] Certificate Issued May 30, 1989

[54] DENTAL HANDPIECE

[75] Inventor: Seymour M. Hutchinson, Plainview, N.Y.

[73] Assignee: Seymour M. Hutchinson, Plainview; Adrian N. Spitz, Massapequa; J. Jordon Kunin, New York, N.Y., a part interest to each

Reexamination Request:
No. 90/001,540, Jun. 22, 1988

Reexamination Certificate for:
Patent No.: 3,634,938
Issued: Jan. 18, 1972
Appl. No.: 65,031
Filed: Aug. 19, 1970

[51] Int. Cl.⁴ .............................. A61C 1/00; A61C 3/00
[52] U.S. Cl. ............................................ 433/29; 433/104
[58] Field of Search ............... 433/29, 104; 350/96.24; 173/46

[56] References Cited

U.S. PATENT DOCUMENTS

| | | | |
|---|---|---|---|
| 2,038,911 | 4/1936 | Stutz et al. | 240/2 |
| 2,066,313 | 1/1937 | Barr | 32/69 |
| 2,255,657 | 9/1941 | Freedman | 32/33 |
| 2,517,882 | 8/1950 | Johnson | 172/36 |
| 2,539,828 | 1/1951 | Goldis et al. | 240/2.18 |
| 2,679,103 | 5/1954 | Erickson | 32/69 |
| 3,032,878 | 5/1962 | White | 32/27 |
| 3,032,879 | 5/1962 | LaFitte | 32/69 |
| 3,098,299 | 7/1963 | Page | 32/27 |
| 3,109,238 | 11/1963 | Marks | 32/27 |
| 3,120,705 | 2/1964 | Hoffmeister et al. | 32/27 |
| 3,210,848 | 11/1965 | Bizigotti | 32/27 |
| 3,255,527 | 6/1966 | Staunt | 32/27 |
| 3,397,457 | 8/1968 | Gosselin | 32/27 |

*Primary Examiner*—Robert Peshock

[57] ABSTRACT

A dental handpiece having an air turbine drive for the drill bit and a water jet stream for cooling the operating area, including fiber optics means for directing light upon the dental work area, and including a light source for the fiber optics incorporated into the dental handpiece. The air and water systems are utilized to absorb heat generated in the handpiece by the light source.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-17 is confirmed.

* * * * *